United States Patent
Landais et al.

(10) Patent No.: US 11,758,395 B2
(45) Date of Patent: Sep. 12, 2023

(54) SUPPORT OF DEDICATED CORE NETWORKS FOR WLAN ACCESS

(71) Applicant: Nokia Solutions and Networks Oy, Espoo (FI)

(72) Inventors: Bruno Landais, Pleumeur-Bodou (FR); Nicolas Drevon, Paris (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 323 days.

(21) Appl. No.: 16/099,174

(22) PCT Filed: May 10, 2017

(86) PCT No.: PCT/EP2017/061135
§ 371 (c)(1),
(2) Date: Nov. 5, 2018

(87) PCT Pub. No.: WO2017/194581
PCT Pub. Date: Nov. 16, 2017

(65) Prior Publication Data
US 2020/0314100 A1    Oct. 1, 2020

(30) Foreign Application Priority Data
May 10, 2016 (EP) .................................. 16305544

(51) Int. Cl.
*H04L 29/06* (2006.01)
*H04W 12/06* (2021.01)
(Continued)

(52) U.S. Cl.
CPC ......... *H04W 12/06* (2013.01); *H04L 63/0892* (2013.01); *H04L 63/20* (2013.01); *H04W 48/08* (2013.01); *H04W 84/12* (2013.01)

(58) Field of Classification Search
None
See application file for complete search history.

(56) References Cited

U.S. PATENT DOCUMENTS 9,755,891 B2 * 9/2017 D'Souza ............... H04M 15/66
2014/0169269 A1 * 6/2014 Salot ................... H04L 47/2408
370/328
(Continued)

FOREIGN PATENT DOCUMENTS

CN    101330740 A    12/2008
CN    102238727 A    11/2011
(Continued)

OTHER PUBLICATIONS

Corici, Marius et al. Integrating off-the-shelf 3GPP access networks in the OpenEPC software toolkit: Realizing cost-efficient and complete small-scale operator testbeds. 2012 IEEE Globecom Workshops. https://ieeexplore.ieee.org/stamp/stamp.jsp?tp=&arnumber=6477845 (Year: 2012).*

(Continued)

*Primary Examiner* — Jeremiah L Avery
(74) *Attorney, Agent, or Firm* — SQUIRE PATTON BOGGS (US) LLP

(57) ABSTRACT

Embodiments of the invention include an entity such as TWAN entity, respectively ePDG, capable of serving a User Equipment UE at Trusted, respectively Untrusted, WLAN access to a packet Core Network such as EPC, said entity configured to: —perform DCN selection at said Trusted, respectively Untrusted, WLAN access of said UE to said packet Core Network such as EPC.

26 Claims, 5 Drawing Sheets

Figure 1:
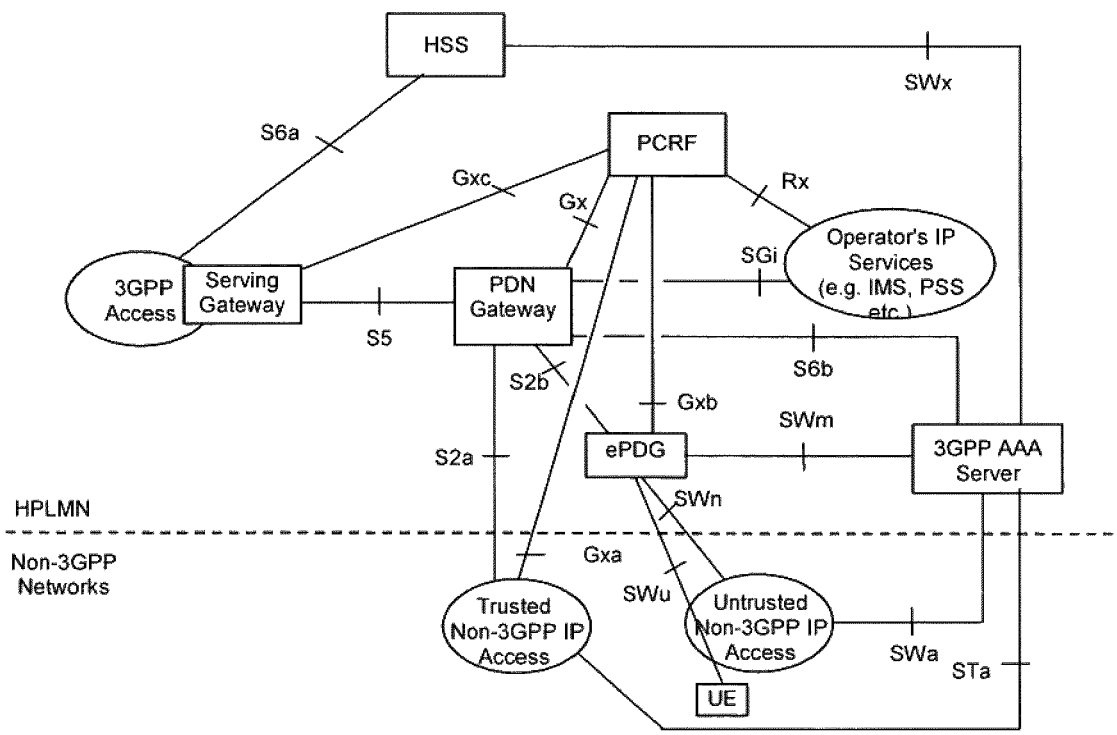

(51) Int. Cl.
*H04L 9/40* (2022.01)
*H04W 48/08* (2009.01)
*H04W 84/12* (2009.01)

(56) References Cited

U.S. PATENT DOCUMENTS

| | | | |
|---|---|---|---|
| 2016/0050601 | A1 | 2/2016 | Jeong et al. |
| 2016/0262068 | A1* | 9/2016 | Won ........................ H04L 67/12 |
| 2017/0126618 | A1* | 5/2017 | Bhaskaran ........... H04L 61/5014 |
| 2017/0156086 | A1* | 6/2017 | Tomici .................. H04W 76/12 |
| 2018/0332457 | A1* | 11/2018 | Thiebaut ............. H04W 12/041 |
| 2019/0028878 | A1* | 1/2019 | Kawasaki ............. H04W 76/12 |

FOREIGN PATENT DOCUMENTS

| | | |
|---|---|---|
| CN | 102761935 A | 10/2012 |
| CN | 102917356 A | 2/2013 |
| CN | 103188667 A | 7/2013 |
| CN | 103517252 A | 1/2014 |
| CN | 103533598 A | 1/2014 |
| EP | 3 244 588 B1 | 6/2021 |
| WO | 2010/076044 A1 | 7/2010 |
| WO | WO 2013/159310 A1 | 10/2013 |
| WO | 2016/011001 A1 | 1/2016 |

OTHER PUBLICATIONS

Peng, Zhang et al. Network selection in WLAN-3GPP interworking system. IEEE 60th Vehicular Technology Conference, 2004. https://ieeexplore.ieee.org/stamp/stamp.jsp?tp=&arnumber=1405038 (Year: 2004).*

Cheboldaeff, Marc. Interactions between a Mobile Virtual Network Operator and External Networks with Regard to Service Triggering. Sixth International Conference on Networking (ICN'07). https://ieeexplore.ieee.org/stamp/stamp.jsp?tp=&arnumber=4196236 (Year: 2007).*

Corici, Marius et al. Enabling dynamic service delivery in the 3GPP Evolved Packet Core. 2010 IEEE Globecom Workshops, https://ieeexplore.ieee.org/stamp/stamp.jsp?tp=&arnumber=5700297 (Year: 2010).*

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401, V13.6.1, Mar. 2016, pp. 1-365.

"3rd Generation Partnership Project; Technical Specification Group Services and System Aspects; Architecture enhancements for non-3GPP accesses (Release 13)", 3GPP TS 23.402, V13.5.0, Mar. 2016, pp. 1-299.

"3rd Generation Partnership Project; Technical Specification Group Core Network and Terminals; Evolved Packet System (EPS); 3GPP EPS AAA interfaces (Release 13)", 3GPP TS 29.273, V13.3.0, Mar. 2016, pp. 1-172.

"3rd Generation Partnership Project; Technical Specification Group Core Network and Terminals; Domain Name System Procedures; Stage 3 (Release 13)", 3GPP TS 29.303, V13.3.0, Mar. 2016, pp. 1-68.

"3rd Generation Partnership Project; Technical Specification Group Services and System Aspects; Enhancements of Dedicated Core Networks selection mechanism; (Release 14)", 3GPP TR 23.711, V0.4.0, Apr. 2016, pp. 1-30.

"3rd Generation Partnership Project; Technical Specification Group Services and System Aspects; 3GPP System Architecture Evolution (SAE); Security aspects of non-3GPP accesses (Release 13)", 3GPP TS 33.402, V13.0.0, Sep. 2015, pp. 1-56.

Extended European Search Report received for corresponding European Patent Application No. 16305544.5, dated Nov. 3, 2016, 6 pages.

International Search Report and Written Opinion received for corresponding Patent Cooperation Treaty Application No. PCT/EP2017/061135, dated Aug. 9, 2017, 10 pages.

Office action received for corresponding European Patent Application No. 16305544.5, dated Jul. 5, 2019, 5 pages.

Office action received for corresponding European Patent Application No. 16305544.5, dated Apr. 17, 2020, 4 pages.

Office action received for corresponding Indian Patent Application No. 201847042110, dated Jul. 17, 2020, 6 pages.

Notification of the First Office Action dated Dec. 15, 2020 corresponding to Chinese Patent Application No. 2017800294365, with English Summary of Office Action.

Mexican Office Action corresponding to MX Application No. MX/a/2018/013745, dated May 26, 2022.

Mexican Office Action corresponding to MX Application No. MX/a/2018/013745, dated Oct. 4, 2022.

* cited by examiner

SUPPORT OF DEDICATED CORE NETWORKS FOR WLAN ACCESS

RELATED APPLICATION

This application was originally filed as PCT Application No. PCT/EP2017/061135 filed May 10, 2017 which claims priority benefit from EP Application No. 16305544.5 filed May 10, 2016.

The present invention generally relates to mobile communication networks and systems.

Descriptions of mobile networks and systems can be found in the literature, such as in particular in Technical Specifications published by standardization bodies such as for example 3GPP (3$^{rd}$ Generation Partnership Project).

An example of 3GPP mobile system is EPS (Evolved Packet System). An EPS network comprises a Core Network called EPC (Evolved Packet Core) that can be accessed not only by 3GPP access (such as E-UTRAN access), but also by non-3GPP access (such as WLAN access). 3GPP access to EPC is specified in particular in 3GPP TS 23.401 (for E-UTRAN access). WLAN access to EPC is specified in particular in 3GPP TS 23.402, and includes Trusted WLAN access and Untrusted WLAN access. An example of architecture for 3GPP and Non 3GPP (Trusted or Untrusted) access to EPC is recalled in FIG. 1 taken from 3GPP TS 23.402.

Trusted WLAN access to EPC involves entities such as TWAN (Trusted WLAN Access Network) and 3GPP AAA Server. TWAN interfaces with a PDN Gateway PGW of EPC via S2a interface specified in particular in 3GPP TS 23.402. TWAN interfaces with 3GPP AAA Server via STa interface, specified in particular in 3GPP TS 29.273.

Untrusted WLAN access to EPC involves entities such as ePDG (evolved Packet Data Gateway) and 3GPP AAA Server. ePDG interfaces with a PDN Gateway PGW of EPC via S2b interface specified in particular in 3GPP TS 23.402. ePDG interfaces with 3GPP AAA Server via SWm interface, specified in particular in 3GPP TS 29.273.

Support of Dedicated Core Networks (DCN) has been introduced for 3GPP access. As specified in 3GPP TS 23.401, a DCN comprises one or more MME/SGSN and it may comprise one or more SGW/PGW/PCRF; this feature enables subscribers to be allocated to and served by a DCN based on subscription information ("UE Usage Type"), locally configured operator's policies and UE related context information available at the serving network.

However, DCN is currently not supported for WLAN access, which implies different disadvantages as recognized by the inventors and as will be explained with more detail later. There is a need to provide DCN support for WLAN access, more generally there is a need to provide enhanced functionalities in such networks and systems.

Embodiments of the present invention in particular address such needs.

These and other objects are achieved, in one aspect, by an entity such as TWAN entity, respectively ePDG, capable of serving a User Equipment UE at Trusted, respectively Untrusted, WLAN access to a packet Core Network such as EPC, said entity configured to:
  perform DCN selection at said Trusted, respectively Untrusted, WLAN access of said UE to said packet Core Network such as EPC.

These and other objects are achieved, in another aspect, by a Home Subscriber Server HSS, configured to:
  download DCN-selection-related UE subscription information to a 3GPP AAA Server during an authentication and authorization procedure performed at Trusted, respectively Untrusted, WLAN access of said UE to a packet Core Network such as EPC.

These and other objects are achieved, in another aspect, by a 3GPP AAA Server, configured to:
  send DCN selection information, at Trusted, respectively Untrusted, access of a UE to a packet Core Network such as EPC, to an entity such as TWAN entity, respectively ePDG, capable of serving said UE at said Trusted, respectively Untrusted, WLAN access.

These and other objects are achieved, in another aspect, by a 3GPP AAA Proxy, configured to:
  send DCN selection information, at Trusted, respectively Untrusted, access of a UE to a packet Core Network such as EPC, to an entity such as TWAN entity, respectively ePDG, capable of serving said UE at said Trusted, respectively Untrusted, WLAN access.

These and other objects are achieved, in another aspect, by method(s) for support of DCN for WLAN access to a packet Core Network such as EPC, such method(s) comprising at least one step performed by at least one of such entities: entity such as ePDG or TWAN entity, capable of serving a User Equipment at Trusted, respectively Untrusted, WLAN access to EPC, Home Subscriber Server HSS, 3GPP AAA Server, 3GPP AAA Proxy.

Figure 2:
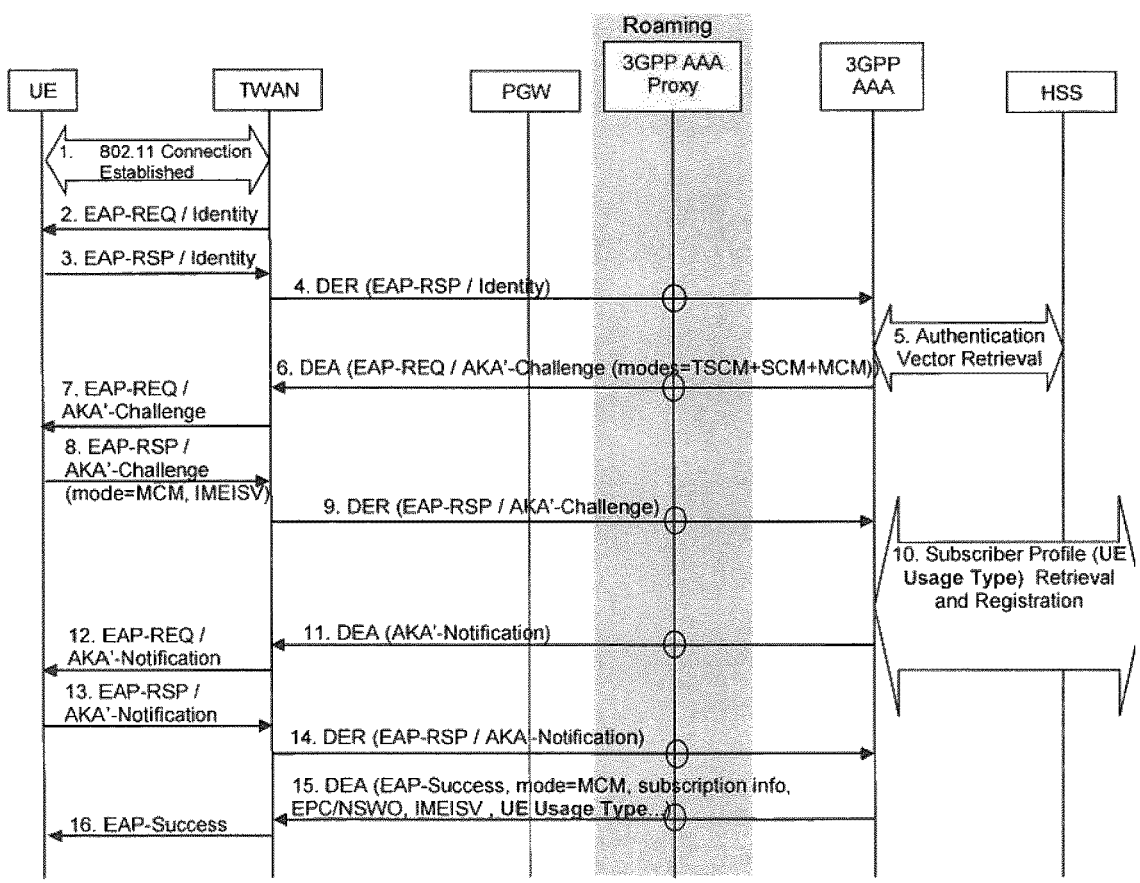
Figure 3:
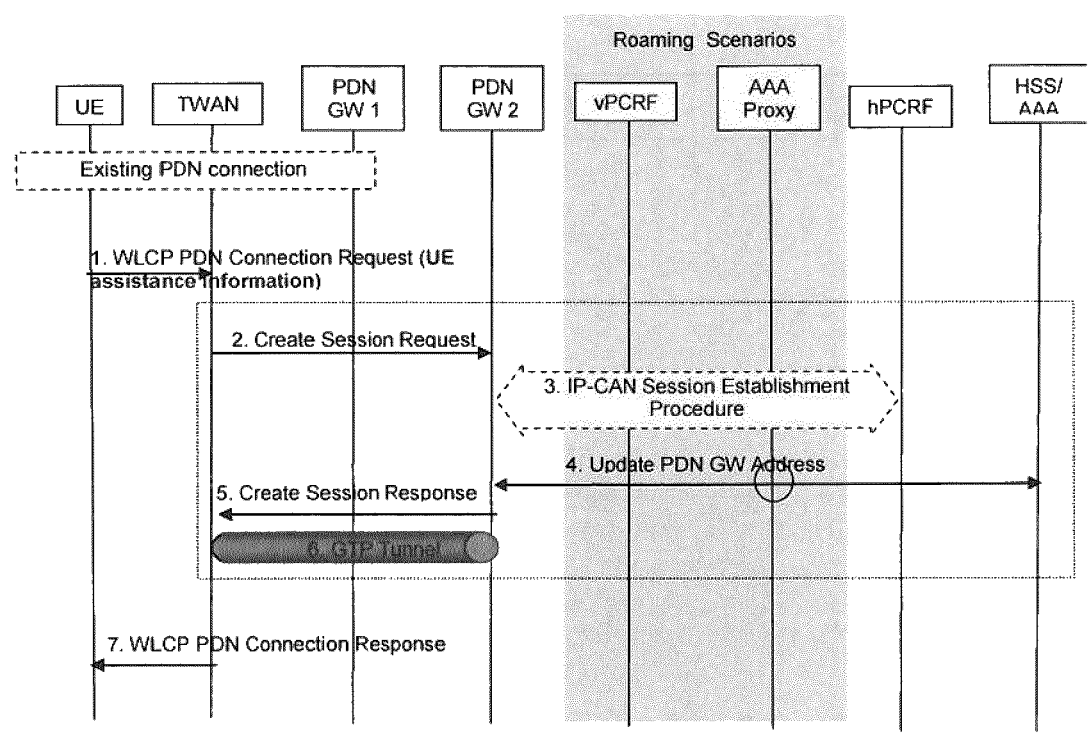
Figure 4:
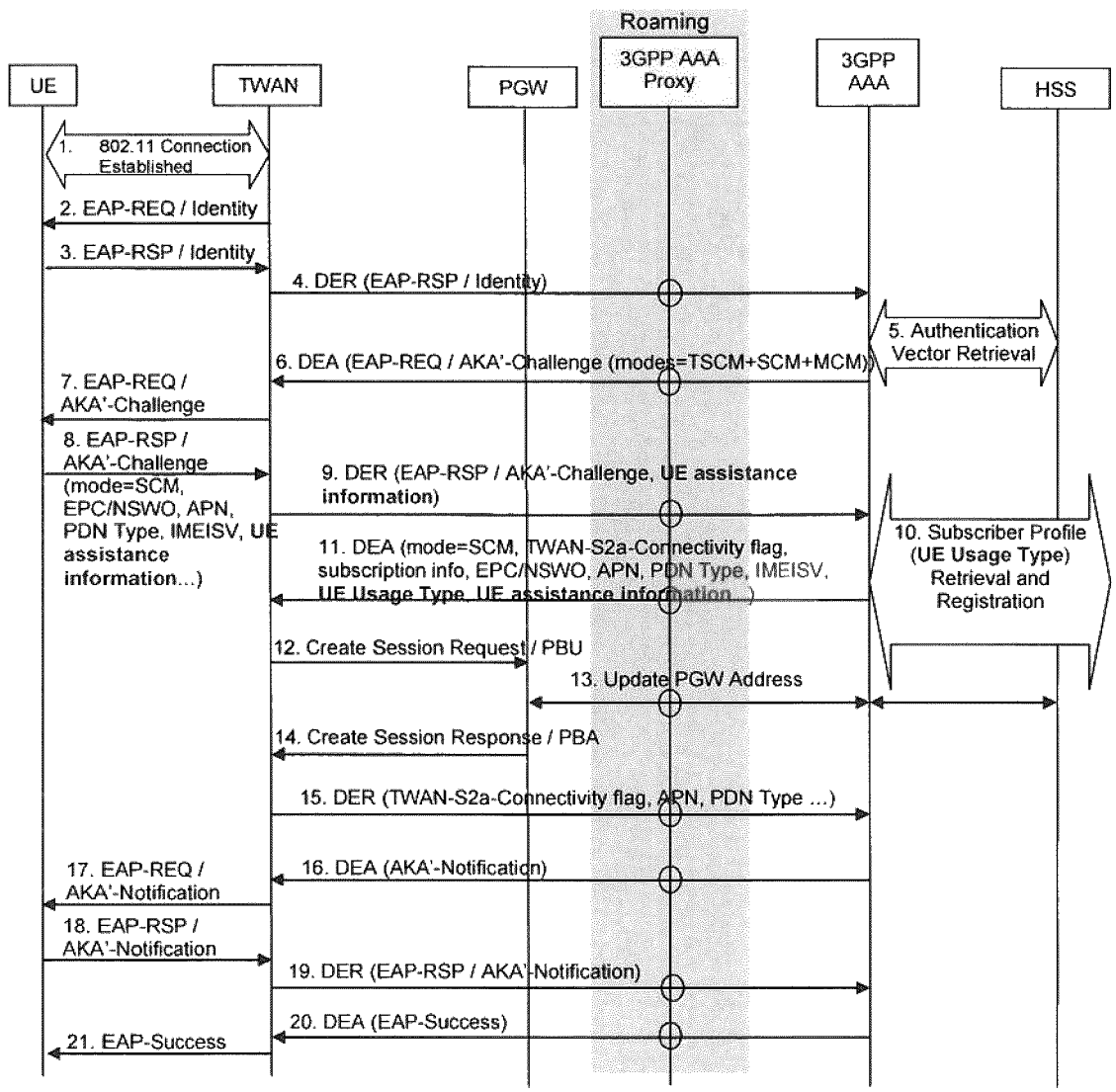
Figure 5:
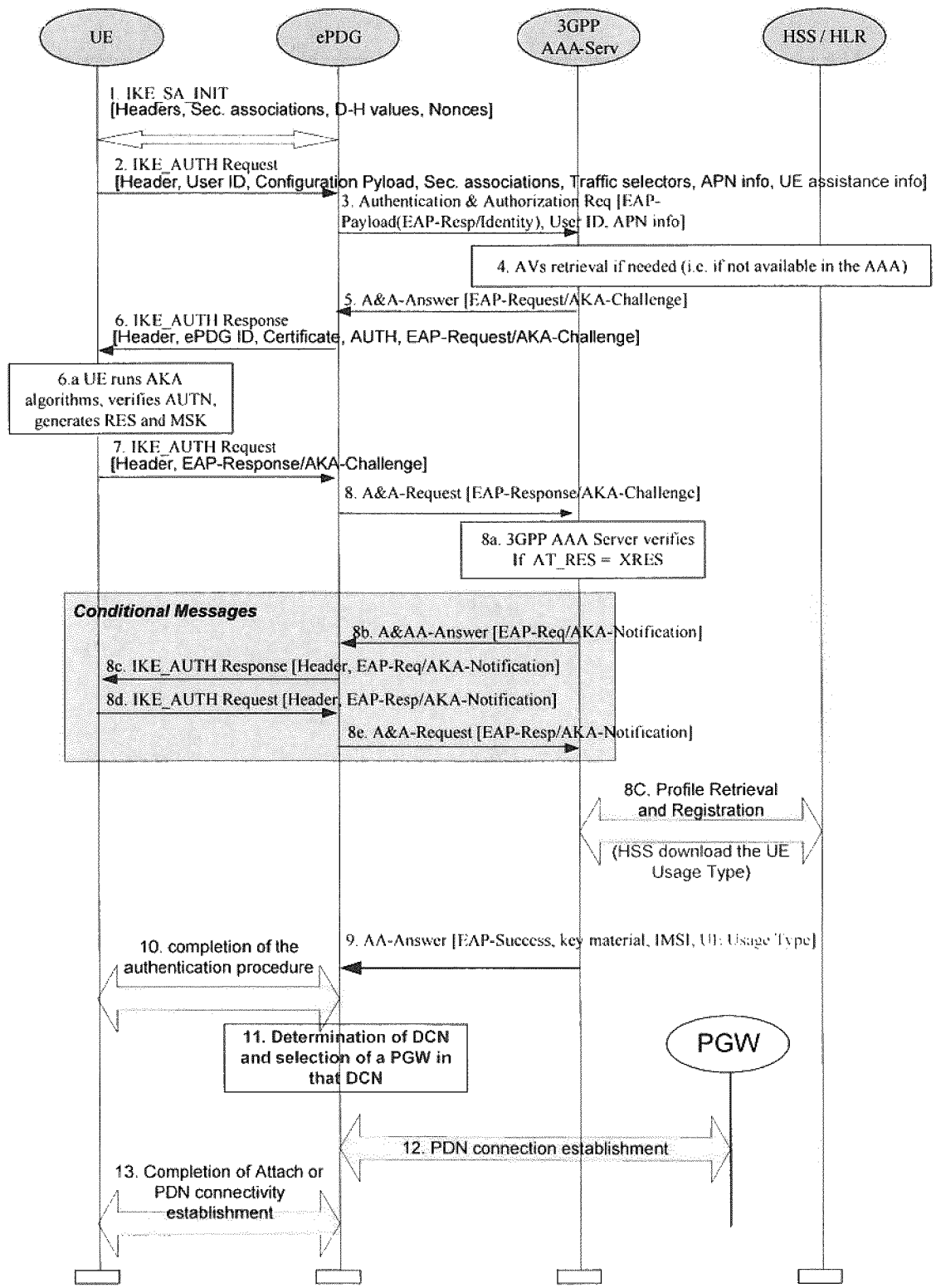

Some embodiments of apparatus and/or methods in accordance with embodiments of the present invention are now described, by way of example only, and with reference to the accompanying drawings, in which:

FIG. 1 is intended to recall an example of architecture for 3GPP and Non 3GPP (Trusted or Untrusted) access to EPC, FIG. 2 is intended to illustrate a first example of signaling flow for support of DCN at Trusted WLAN access to EPC in Multi-Connection Mode, according to embodiments of the invention, FIG. 3 is intended to illustrate a second example of signaling flow for support of DCN at Trusted WLAN access to EPC in Multi-Connection Mode, according to embodiments of the invention, FIG. 4 is intended to illustrate an example of signaling flow for support of DCN at Trusted WLAN access to EPC in Single-Connection Mode, according to embodiments of the invention, FIG. 5 is intended to illustrate an example of signaling flow for support of DCN at Untrusted WLAN access to EPC, according to embodiments of the invention.

ABBREVIATIONS

AAA Authentication Authorization Accounting
AKA Authentication and Key Agreement
DEA Diameter EAP Answer
DCN Dedicated Core Network
DER Diameter EAP Request
EAP Extensible Authentication Protocol
EPC Evolved Packet Core
ePDG Evolved Packet Data Gateway
EPS Evolved Packet System
HSS Home Subscriber Server
IMSI International Mobile Subscriber Identity
PDN Packet Data Network
PGW PDN Gateway
PLMN Public Land Mobile Network
TWAN Trusted WLAN Access Network
UWAN Untrusted WLAN Access Network
UE User Equipment
WLAN Wireless Local Area Network
WLCP Wireless LAN Control Plane protocol

DESCRIPTION OF VARIOUS ASPECTS AND/OR EMBODIMENTS OF THE INVENTION

3GPP has specified new procedures in Release 13 which enable an operator to deploy multiple Dedicated Core Networks (DCNs) within a PLMN with each DCN consisting of one or multiple CN nodes (e.g. MMEs, SGSNs, SGWs or PGWs), and where each DCN may be dedicated to serve specific type(s). See subclause 4.3.25 of 3GPP TS 23.401.

There can be several motivations for deploying DCNs, e.g. to provide DCNs with specific characteristics/functions or scaling, to isolate specific UEs or subscribers (e.g. M2M subscribers, subscribers belonging to a specific enterprise or separate administrative domain, etc.).

The solution relies on provisioning the UE-Usage-Type parameter and possibly other parameters such as IMSI, IMSI-Group-ID, etc. in the user's subscription in the HSS, and on the MME/SGSN determining the DCN serving a particular UE by using this HSS provided information, plus other possible information available from the UE context (e.g. roaming status, IMSI, IMSI-Group-ID) and local policy. The MME/SGSN then ensures that an MME/SGSN from the selected DCN serves that UE (by redirecting the UE to another MME/SGSN if necessary), and selects an SGW and PGW from that DCN using enhanced DNS procedures for DCNs specified in TS 29.303.

3GPP is further enhancing these procedures in Release 14 to improve the DCN selection by using assistance information from the UE, in addition to the said information specified in Rel-13. See 3GPP TR 23.711. This assistance information can be the UE Usage Type or a DCN identity related information provided by the Core Network in earlier exchanges between the UE and the PLMN.

These procedures have however only been defined so far for 3GPP accesses (E-UTRAN, UTRAN and GERAN). This implies that DCN selection procedures cannot be used when a UE establishes PDN connections via a trusted or untrusted WLAN access, with the following consequences:

a) it is not possible to select a PGW pertaining to a specific DCN based on the UE usage type or a DCN identity related information, for a UE accessing the EPC via a trusted or untrusted WLAN; so it is not possible for instance to e.g. isolate subscribers belonging to a specific enterprise or separate administrative domain.

b) the subscriber may be assigned different PGWs and services, depending on whether it is on a 3GPP or a WLAN access when establishing the PDN connection, and DCN is used for 3GPP accesses;

c) on-going PDN connections may have to be torn down when the UE moves from a WLAN to a 3GPP access, to relocate the PGW in a DCN expected to serve that UE. This would lead to a change of UE IP address and potential break of the service (banking, voice).

Embodiments of the invention provide DCN support for WLAN access (Trusted or Untrusted).

In an embodiment, the TWAN or ePDG retrieves the UE Usage type and other subscription parameters such as IMSI-Group-id, etc., provisioned in the user's subscription in the HSS, via the 3GPP AAA Server, during the authentication and authorization procedure over the trusted or untrusted WLAN access.

Additionally or alternatively, in an embodiment, the UE may provide assistance information to the TWAN or ePDG during the authentication and authorization or during the WLCP PDN connection establishment, via new information passed over IKEv2 for an untrusted WLAN access, or passed via WLCP or via EAP protocols for a trusted WLAN access. This assistance information may be provided earlier by the Core Network when the UE is attaching or registering to the 3GPP network via 3GPP access (per current "eDECOR" 3GPP study). It might be either the UE Usage Type or an identity related to the DCN.

In an embodiment, the TWAN or ePDG determines the DCN to serve this UE based on the UE Usage Type and other subscription parameters such as IMSI, IMSI-Group-ID, etc. In an embodiment, the TWAN or ePDG determines the DCN to serve this UE based on one or more of: the UE Usage Type, subscription parameters received from the HSS, UE related information such as roamer/non-roamer, and local policy configured in the TWAN or ePDG or configured in the AAA server (non-roaming case) or AAA proxy (roaming case). As an alternative, the TWAN or ePDG determines the DCN to serve the UE based on the assistance information provided by the UE. The TWAN/ePDG selects then a PGW in that DCN, applying the DNS procedures enhanced for DCNs specified in TS 29.303.

The term "DCN selection information" will be used to cover all kind of information the TWAN, or the ePDG (or more generally an entity capable of serving the UE at Trusted, or Untrusted, WLAN access to EPC) may use to perform DCN selection. In some embodiments, DCN selection information may comprise "DCN-selection-related UE subscription information", or more simply "UE subscription information", (which term will be used to cover all kind of information retrieved from HSS and which may be used for DCN selection), and/or "UE assistance information" (which term is used to cover information provided by the UE). DCN selection information may also comprise policy information (which will also be called 3GPP AAA Server policy information, or 3GPP AAA Proxy policy information).

Examples of signaling flows for support of DCN for WLAN access will now be described.

Examples of Trusted WLAN call flows for the Multi-Connection Mode are depicted in the FIGS. 2 and 3.

FIG. 2 illustrates an example of changes introduced, according to embodiments of the invention, in the authentication and authorization procedure (based on 3GPP TS 29.273) performed at Trusted WLAN access for Multi-Connection Mode. FIG. 3 illustrates an example of changes introduced, according to embodiments of the invention, in the subsequent UE-initiated PDN connectivity procedure (based on 3GPP TS 23.402), performed once the UE has been successfully authenticated and authorized.

Embodiments of the invention may involve following changes in the authentication and authorization procedure, as illustrated in FIG. 2:

during the authentication and authorization procedure, at step 10, the HSS also downloads UE subscription information, such as (as illustrated in the figure) the UE Usage Type (if provisioned in the user's subscription) and possibly other subscription parameters such as IMSI, IMSI-Group-ID, etc. to the 3GPP AAA Server. The 3GPP AAA Server forwards the received information possibly together with AAA local policy information to the TWAN at step 15. If the TWAN is accessed through a 3GPP AAA Proxy, the AAA local policy information is instead provided by the 3GPP AAA Proxy.

Embodiments of the invention may involve following changes in the UE-Initiated PDN Connectivity procedure, as illustrated in FIG. 3:

at step 1, the UE may optionally provide UE assistance information to the TWAN in the WLCP PDN Connection Request. By way of example, FIG. 3 illustrates the case where the UE provides UE assistance information.

NOTE: As an alternative, the UE could provide the UE assistance information to the TWAN via EAP (during the authentication and authorization procedure) as specified for the SCM (Single-Connection Mode) further down, in which case WLCP would not be impacted.

at step 2, the TWAN determines (not specifically illustrated in the figure) the DCN for that UE, before initiating PDN connection establishment (sending a Create Session Request) towards this DCN. The TWAN may determine the DCN for that UE based on the UE Usage Type, on the said subscription parameters received from the HSS, on UE related information such as roamer/non-roamer, on local TWAN policy, and on AAA local policy received from the 3GPP AAA proxy/server. As an alternative, the TWAN may determine the DCN to serve the UE based on the assistance information provided by the UE. The TWAN may then select a PGW in that DCN, following the PGW selection procedures enhanced for DCN specified in TS 29.303. The TWAN may then initiate a PDN connection establishment procedure to that PGW.

An example of signaling flow for Trusted WLAN, for the Single-Connection Mode is depicted in FIG. 4.

FIG. 4 illustrates an example of changes introduced, according to embodiments of the invention, in the authentication and authorization procedure (based on 3GPP TS 29.273) performed at Trusted WLAN access for Single-Connection Mode.

Embodiments of the invention may involve following changes in the authentication and authorization procedure, as illustrated in FIG. 4:

at step 8, the UE optionally provides UE assistance information to the TWAN via EAP. The information is sent (transparently) by the TWAN to the 3GPP AAA Server at step 9. The 3GPP AAA Server forwards this information possibly together with local AAA policy information to the TWAN at step 11. By way of example, FIG. 4 illustrates the case where the UE provides UE assistance information.

during the authentication and authorization procedure, at step 10, the HSS also downloads UE subscription information, such as (as illustrated in the figure) the UE Usage Type (if provisioned in the user's subscription) and possibly other subscription parameters such as IMSI, IMSI-Group-ID, etc. to the 3GPP AAA Server. The 3GPP AAA Server forwards the received information possibly together with local AAA policy information to the TWAN at step 11.

at step 12, the TWAN determines (not specifically illustrated in the figure) the DCN for that UE, before initiating PDN connection establishment (sending of a Create Session Request towards this DCN). The TWAN may determine the DCN for that UE based on the UE Usage Type, on the said subscription parameters received from the HSS, on UE related information such as roamer/non-roamer, on local TWAN policy, and on AAA local policy received from the AAA proxy/server. As an alternative, the TWAN may determine the DCN to serve the UE based on the assistance information provided by the UE. The TWAN may then select a PGW in that DCN, following the PGW selection procedures enhanced for DCN specified in TS 29.303. The TWAN may then initiate a PDN connection establishment procedure to that PGW.

An example of Untrusted WLAN call flow is depicted in FIG. 5.

FIG. 5 illustrates an example of changes introduced, according to embodiments of the invention, in the authentication and authorization procedure (based on 3GPP TS 33.402) performed at Untrusted WLAN access.

Embodiments of the invention may involve following changes in the authentication and authorization procedure, as illustrated in FIG. 5:

at step 2, the UE optionally provides UE assistance information to the ePDG via IKE V2. The information is stored by the ePDG. By way of example, FIG. 5 illustrates the case where the UE provides UE assistance information.

during the authentication and authorization procedure, at step 8C, the HSS also downloads UE subscription information such as (as illustrated in the figure) the UE Usage Type (if provisioned in the user's subscription) and possibly other subscription parameters such as IMSI, IMSI-Group-ID, etc. to the 3GPP AAA Server. The 3GPP AAA Server forwards the received information possibly together with local AAA policy information to the TWAN at step 9.

at step 11, the ePDG determines the DCN for that UE. The ePDG may determine the DCN for that UE based on the UE Usage, on the said subscription parameters received from the HSS, on UE related information such as roamer/non-roamer, on local policy, and on AAA local policy received from the AAA. As an alternative, the ePDG may determine the DCN to serve the UE based on the assistance information provided by the UE. The ePDG may selects a PGW in that DCN, following the PGW selection procedures enhanced for DCN specified in TS 29.303. The ePDG may then initiate a PDN connection establishment procedure to that PGW (step 12).

Various aspects and/or embodiments of the invention include (though not being limited to) following aspects and/or embodiments.

Some aspects are related to an entity, such as TWAN entity, respectively ePDG, capable of serving a User Equipment UE at Trusted, respectively Untrusted, WLAN access to a packet Core Network such as EPC.

Various embodiments are provided, including (though not being limited to) following embodiments, which may be taken alone or in combination, according to various combinations.

In an embodiment said entity is configured to:

perform DCN selection at said Trusted, respectively Untrusted, WLAN access of said UE to said packet Core Network such as EPC.

In an embodiment said entity is configured to:

select a PGW pertaining to the selected DCN.

In an embodiment said entity is configured to:

perform DCN selection based on DCN selection information including DCN-selection-related UE subscription information.

In an embodiment said entity is configured to:

receive said DCN-selection-related UE subscription information during an authentication and authorization procedure performed at said Trusted, respectively Untrusted, WLAN access.

In an embodiment said entity such as TWAN entity is configured to:
receive said DCN-selection-related UE subscription information in a DEA message from a 3GPP AAA Server or a 3GPP AAA Proxy.

In an embodiment said entity such as ePDG is configured to:
receive said DCN-selection-related UE subscription information in a AA-Answer message from a 3GPP AAA Server or a 3GPP AAA Proxy.

In an embodiment:
said DCN-selection-related UE subscription information includes UE Usage Type parameter or any other parameter in the user subscription which may be used for DCN selection.

In an embodiment said entity is configured to:
perform DCN selection based on DCN selection information further including 3GPP AAA Server policy information or 3GPP AAA Proxy policy information.

In an embodiment said entity is configured to:
receive said 3GPP AAA Server policy information or 3GPP AAA Proxy policy information during said authentication and authorization procedure.

In an embodiment said entity is configured to:
perform DCN selection based on DCN selection information including UE assistance information.

In an embodiment said entity such as TWAN entity is configured to:
receive said UE assistance information during a UE-Initiated PDN Connectivity procedure at Trusted WLAN access in Multi-Connection Mode.

In an embodiment said entity such as TWAN entity is configured to:
receive said UE assistance information in a WLCP message from said UE at Trusted WLAN access in Multi-Connection Mode.

In an embodiment said entity such as TWAN entity is configured to:
receive said UE assistance information from a 3GPP AAA Server during a authentication and authorization procedure at Trusted WLAN access.

In an embodiment said entity such as TWAN entity is configured to:
receive said UE assistance information from a 3GPP AAA Server in a DEA message during an authentication and authorization procedure at Trusted WLAN access.

In an embodiment said entity such as TWAN entity is configured to:
transparently send said UE assistance information received via EAP to a 3GPP AAA Server during an authentication and authorization procedure at Trusted WLAN access.

In an embodiment said entity such as TWAN entity is configured to:
transparently send said UE assistance information to a 3GPP AAA Server in a DER message during an authentication and authorization procedure at Trusted WLAN access.

In an embodiment said entity such as ePDG is configured to:
receive said UE assistance information from said UE during a IKE authentication and authorization procedure.

In an embodiment said entity such as ePDG is configured to:
receive said UE assistance information from said UE in a IKE_AUTH Request message.

In an embodiment said entity is configured to:
perform DCN selection based on DCN selection information further including 3GPP AAA Server policy information or 3GPP AAA Proxy policy information.

In an embodiment said entity is configured to:
receive said 3GPP AAA Server policy information or 3GPP AAA Proxy policy information from a 3GPP AAA Server or a 3GPP AAA Proxy during an authentication and authorization procedure performed at said Trusted, respectively Untrusted, WLAN access.

Other aspects are related to a Home Subscriber Server HSS.

Various embodiments are provided, including (though not being limited to) following embodiments, which may be taken alone or in combination, according to various combinations.

In an embodiment, said HSS is configured to:
download DCN-selection-related UE subscription information to a 3GPP AAA Server during an authentication and authorization procedure performed at Trusted, respectively Untrusted, WLAN access of said UE to a packet Core Network such as EPC.

In an embodiment:
said DCN-selection-related UE subscription information includes UE Usage Type parameter or any other parameter in the user subscription which may be used for DCN selection.

Other aspects are related to a 3GPP AAA Server.

Various embodiments are provided, including (though not being limited to) following embodiments, which may be taken alone or in combination, according to various combinations.

In an embodiment, said 3GPP AAA Server is configured to:
send DCN selection information, at Trusted, respectively Untrusted, access of a UE to a packet Core Network such as EPC, to an entity such as TWAN entity, respectively ePDG, capable of serving said UE at said Trusted, respectively Untrusted, WLAN access.

In an embodiment:
said DCN selection information includes DCN-selection-related UE subscription information retrieved by said 3GPP AAA Server from a HSS during an authentication and authorization procedure performed at said Trusted, respectively Untrusted, WLAN access.

In an embodiment, said 3GPP AAA Server is configured to:
forward said DCN-selection-related UE subscription information to an entity such as TWAN entity in a DEA message.

In an embodiment, said 3GPP AAA Server is configured to:
forward said DCN-selection-related UE subscription information to an entity such as ePDG in a AA-Answer message.

In an embodiment:
said DCN-selection-related UE subscription information includes UE Usage Type parameter or any other parameter in the user subscription which may be used for DCN selection.

In an embodiment:
said DCN selection information includes UE assistance information forwarded to said 3GPP AAA Server by said entity such as TWAN entity during an authentication and authorization procedure at Trusted WLAN access.

In an embodiment:
  said DCN selection information includes 3GPP AAA Server policy information.

Other aspects are related to a 3GPP AAA Proxy.

Various embodiments are provided, including (though not being limited to) following embodiments, which may be taken alone or in combination, according to various combinations.

In an embodiment, said 3GPP AAA Proxy is configured to:
  send DCN selection information, at Trusted, respectively Untrusted, access of a UE to a packet Core Network such as EPC, to an entity such as TWAN entity, respectively ePDG, capable of serving said UE at said Trusted, respectively Untrusted, WLAN access.

In an embodiment:
  said DCN selection information includes DCN-selection-related UE subscription information retrieved from a 3GPP AAA Server during an authentication and authorization procedure performed at said Trusted, respectively Untrusted, WLAN access.

In an embodiment, said 3GPP AAA Proxy is configured to:
  forward said DCN-selection-related UE subscription information to an entity such as TWAN entity in a DEA message.

In an embodiment, said 3GPP AAA Proxy is configured to:
  forward said DCN-selection-related UE subscription information to an entity such as ePDG entity in a AA-Answer message.

In an embodiment:
  said DCN-selection-related UE subscription information includes UE Usage Type parameter or any other parameter in the user subscription which may be used for DCN selection.

In an embodiment:
  said DCN selection information includes UE assistance information forwarded to said 3GPP AAA Proxy by said entity such as TWAN entity during an authentication and authorization procedure at Trusted WLAN access.

In an embodiment:
  said DCN selection information includes 3GPP AAA Proxy policy information.

Other aspects are related to method(s) for support of DCN for WLAN access to a packet Core Network such as EPC, such method(s) comprising at least one step performed by at least one of such entities:
  entity such as TWAN entity, respectively ePDG, capable of serving a User Equipment at Trusted, respectively Untrusted, WLAN access to EPC,
  Home Subscriber Server HSS,
  3GPP AAA Server,
  3GPP AAA Proxy.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising
   at least one processor; and
   at least one memory including computer program code;
   the at least one memory and the computer program code configured to, with the at least one processor, cause the apparatus at least to:
     provide functions of a trusted wireless local area network access network entity capable of serving a user equipment at trusted wireless local area network access to an evolved packet core,
     at said trusted wireless local area network access to said evolved packet core, perform:
   dedicated core network selection based on dedicated core network selection information including dedicated core network-selection-related user equipment subscription information, and
   selection of a packet data network gateway pertaining to said selected dedicated core network,
   wherein:
     said dedicated core network-selection-related user equipment subscription information includes a third generation partnership project user equipment usage type parameter from a user subscription of said user equipment, said third generation partnership project user equipment usage type parameter being provisioned in said user subscription for said dedicated core network selection, and
     said selection of said packet data network gateway is to be performed after said dedicated core network selection.

2. The apparatus according to claim 1, wherein the at least one memory and the computer program code are further configured to, with the at least one processor, cause the apparatus to:
   receive said dedicated core network-selection-related user equipment subscription information during an authentication and authorization procedure performed at said trusted wireless local area network access.

3. The apparatus according to claim 1, wherein the at least one memory and the computer program code are further configured to, with the at least one processor, cause the apparatus to:
   receive said dedicated core network-selection-related user equipment subscription information in a diameter extensible authentication protocol answer message from a third generation partnership project authentication authorization accounting server or a third generation partnership project authentication authorization accounting proxy.

4. The apparatus according to claim 1, wherein:
   said dedicated core network-selection-related user equipment subscription information further includes any other parameter, from said user subscription of said user equipment, usable for said dedicated core network selection.

5. The apparatus according to claim 1, wherein the at least one memory and the computer program code are further configured to, with the at least one processor, cause the apparatus to:
   perform said dedicated core network selection based on said dedicated core network selection information further including third generation partnership project authentication authorization accounting server policy information or third generation partnership project authentication authorization accounting proxy policy information.

6. The apparatus according to claim 5, wherein the at least one memory and the computer program code are further configured to, with the at least one processor, cause the apparatus to:
receive said third generation partnership project authentication authorization accounting server policy information or said third generation partnership project authentication authorization accounting proxy policy information during an authentication and authorization procedure performed at said trusted wireless local area network access.

7. The apparatus according to claim 1, wherein the at least one memory and the computer program code are further configured to, with the at least one processor, cause the apparatus to:
perform said dedicated core network selection based on said dedicated core network selection information further including user equipment assistance information.

8. The apparatus according to claim 7, wherein the at least one memory and the computer program code are further configured to, with the at least one processor, cause the apparatus to:
receive said user equipment assistance information during a user equipment-initiated packet data network connectivity procedure at said trusted wireless local area network access in multi-connection mode.

9. The apparatus according to claim 7, wherein the at least one memory and the computer program code are further configured to, with the at least one processor, cause the apparatus to:
receive said user equipment assistance information in a wireless local area network control plane protocol message from said user equipment at said trusted wireless local area network access in multi-connection mode.

10. The apparatus according to claim 7, wherein the at least one memory and the computer program code are further configured to, with the at least one processor, cause the apparatus to:
receive said user equipment assistance information from a third generation partnership project authentication authorization accounting server during a authentication and authorization procedure at said trusted wireless local area network access.

11. The apparatus according to claim 7, wherein the at least one memory and the computer program code are further configured to, with the at least one processor, cause the apparatus to:
receive said user equipment assistance information from a third generation partnership project authentication authorization accounting server in a diameter extensible authentication message during an authentication and authorization procedure at said trusted wireless local area network access.

12. The apparatus according to claim 7, wherein the at least one memory and the computer program code are further configured to, with the at least one processor, cause the apparatus to:
transparently send said user equipment assistance information received via extensible authentication protocol to a third generation partnership project authentication authorization accounting server during an authentication and authorization procedure at said trusted wireless local area network access.

13. The apparatus according to claim 7, wherein the at least one memory and the computer program code are further configured to, with the at least one processor, cause the apparatus to:
transparently send said user equipment assistance information to a third generation partnership project authentication authorization accounting server in a diameter extensible authentication protocol request message during an authentication and authorization procedure at said trusted wireless local area network access.

14. The apparatus according to claim 5, wherein the at least one memory and the computer program code are further configured to, with the at least one processor, cause the apparatus to:
receive said third generation partnership project authentication authorization accounting server policy information or said third generation partnership project authentication authorization accounting proxy policy information from a third generation partnership project authentication authorization accounting server or a third generation partnership project authentication authorization accounting proxy during an authentication and authorization procedure performed at said trusted wireless local area network access.

15. An apparatus comprising
at least one processor; and
at least one memory including computer program code;
the at least one memory and the computer program code configured to, with the at least one processor, cause the apparatus at least to:
provide functions of an evolved packet data gateway capable of serving a user equipment at untrusted wireless local area network access to an evolved packet core,
at said untrusted wireless local area network access to said evolved packet core, perform:
dedicated core network selection based on dedicated core network selection information including dedicated core network-selection-related user equipment subscription information, and
selection of a packet data network gateway pertaining to said selected dedicated core network,
wherein:
said dedicated core network-selection-related user equipment subscription information includes a third generation partnership project user equipment usage type parameter from a user subscription of said user equipment, said third generation partnership project user equipment usage type parameter being provisioned in said user subscription for said dedicated core network selection, and
said selection of said packet data network gateway is to be performed after said dedicated core network selection.

16. The apparatus according to claim 15, wherein the at least one memory and the computer program code are further configured to, with the at least one processor, cause the apparatus to:
receive said dedicated core network-selection-related user equipment subscription information during an authentication and authorization procedure performed at said untrusted wireless local area network access.

17. The apparatus according to claim 15, wherein the at least one memory and the computer program code are further configured to, with the at least one processor, cause the apparatus to:

receive said dedicated core network-selection-related UE subscription information in an authentication authorization-answer message from a third generation partnership project authentication authorization accounting server or a third generation partnership project authentication authorization accounting proxy.

18. The apparatus according to claim 15 wherein:
said dedicated core network-selection-related user equipment subscription information further includes any other parameter, from said user subscription of said user equipment, usable for said dedicated core network selection.

19. The apparatus according to claim 15, wherein the at least one memory and the computer program code are further configured to, with the at least one processor, cause the apparatus to:
perform said dedicated core network selection based on said dedicated core network selection information further including third generation partnership project authentication authorization accounting server policy information or third generation partnership project authentication authorization accounting proxy policy information.

20. The apparatus according to claim 19, wherein the at least one memory and the computer program code are further configured to, with the at least one processor, cause the apparatus to:
receive said third generation partnership project authentication authorization accounting server policy information or said third generation partnership project authentication authorization accounting proxy policy information during an authentication and authorization procedure performed at said untrusted wireless local area network access.

21. The apparatus according to claim 15, wherein the at least one memory and the computer program code are further configured to, with the at least one processor, cause the apparatus to:
perform said dedicated core network selection based on said dedicated core network selection information further including user equipment assistance information.

22. The apparatus according to claim 21, wherein the at least one memory and the computer program code are further configured to, with the at least one processor, cause the apparatus to:
receive said user equipment assistance information from said user equipment during an internet key exchange authentication and authorization procedure.

23. The apparatus according to claim 21, wherein the at least one memory and the computer program code are further configured to, with the at least one processor, cause the apparatus to:
receive said user equipment assistance information from said user equipment in an internet key exchange authentication request message.

24. The apparatus according to claim 19, wherein the at least one memory and the computer program code are further configured to, with the at least one processor, cause the apparatus to:
receive said third generation partnership project authentication authorization accounting server policy information or said third generation partnership project authentication authorization accounting proxy policy information from a third generation partnership project authentication authorization accounting server or a third generation partnership project authentication authorization accounting proxy during an authentication and authorization procedure performed at said untrusted wireless local area network access.

25. A method comprising:
providing functions of a trusted wireless local area network access network entity capable of serving a user equipment at trusted wireless local area network access to an evolved packet core,
at said trusted wireless local area network access to said evolved packet core, performing:
dedicated core network selection based on dedicated core network selection information including dedicated core network-selection-related user equipment subscription information, and
selection of a packet data network gateway pertaining to said selected dedicated core network,
wherein:
said dedicated core network-selection-related user equipment subscription information includes a third generation partnership project user equipment usage type parameter from a user subscription of said user equipment, said third generation partnership project user equipment usage type parameter being provisioned in said user subscription for said dedicated core network selection, and
said selection of said packet data network gateway is performed after said dedicated core network selection.

26. A method comprising:
providing functions of an evolved packet data gateway capable of serving a user equipment at untrusted wireless local area network access to an evolved packet core,
at said untrusted wireless local area network access to said evolved packet core, performing:
dedicated core network selection based on dedicated core network selection information including dedicated core network-selection-related user equipment subscription information, and
selection of a packet data network gateway pertaining to said selected dedicated core network,
wherein:
said dedicated core network-selection-related user equipment subscription information includes a third generation partnership project user equipment usage type parameter from a user subscription of said user equipment, said third generation partnership project user equipment usage type parameter being provisioned in said user subscription for said dedicated core network selection, and
said selection of said packet data network gateway is performed after said dedicated core network selection.

* * * * *